March 13, 1962  C. D. P. SMALLPEICE  3,024,672
TOOL FEED MECHANISM

Filed Dec. 14, 1959  2 Sheets-Sheet 2

*Inventor*
COSBY D. P. SMALLPEICE
By Mawhinney & Mawhinney
*Attorney*

United States Patent Office 3,024,672
Patented Mar. 13, 1962

3,024,672
TOOL FEED MECHANISM
Cosby Donald Philipps Smallpeice, Flagstaff, Swanwick Shore, near Southampton, England
Filed Dec. 14, 1959, Ser. No. 859,232
11 Claims. (Cl. 77—33.7)

The invention relates to a feed mechanism, for a cutting tool holder of a machine tool (e.g., a lathe or a drilling machine), of the kind in which the power for feeding the tool holder is derived from a pneumatic motor (e.g., a piston and cylinder arrangement). Such a feed mechanism first approaches the cutting tool to the work at a relatively high speed against a minimum of resistance, then feeds the tool for effecting the cutting operation which is performed at a lower speed owing to the resistance of the work to be cut, and after the cutting operation the mechanism in some instances returns the tool holder to its initial position in readiness for another cutting operation.

The main object of the invention is to protect the tool from damage due to the sudden change in the loading conditions to which it is subjected in first engaging the work at the end of the approach movement, and a further object is to protect the work from damage when, at the end of the cutting operation, the resistance to cutting is suddenly decreased.

For this purpose, and according to the invention, a feed mechanism of the kind set forth is combined with hydraulic means adapted momentarily to reduce the effective power of the pneumatic feed as the tool engages the work so as to protect the tool from a sudden overload. It will be seen that the hydraulic means is only operative while the tool starts to bite the work, and that the speed of feed of the tool is thereafter controlled by the pneumatic pressure and the resistance of the work to the cutting operation.

According to a further feature, the hydraulic means is adapted also momentarily to reduce the effective power of the pneumatic feed as the tool reaches the end of its cutting operation so as to prevent the work from being damaged due to a sudden diminution of the resistance to the cutting operation.

Preferably means are provided for adjusting the timing of the operation of the hydraulic means to be in sympathy with a cutting operation to be performed by the tool.

Any suitable means, whether mechanical, pneumatic hydraulic or electrical, can be employed for operating the said hydraulic means in phased relationship to the cutting operation.

One embodiment of the invention is illustrated by the accompanying drawings, in which:

FIGURE 5 shows the tool holder in position on a drilling machine head.

Figure 2:
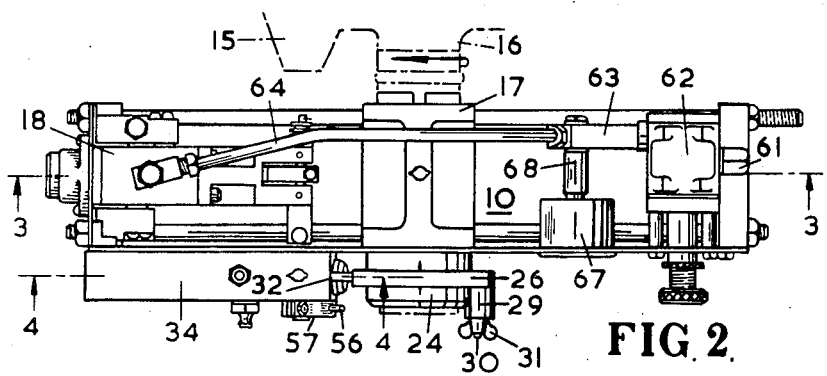
FIGURE 2 is a corresponding plan view.

The feed mechanism includes a pneumatic cylinder 10 containing a piston 11 which is suitably held against rotation about its axis and provided with a rack teeth 12. These teeth mesh a pinion 13 which is fast on one end of a shaft 14, and the other end of the shaft carries a second pinion (not shown) which meshes rack teeth formed on a holder for the drill bit. FIGURE 2 indicates in chain lines at 15 a part of the drilling machine, and it will be seen that it has a boss 16 to which a boss 17 of the feed mechanism is made fast by any suitable means, the shaft 14 extending through the two bosses, and the said second pinion being within the drilling machine.

When air under pressure is admitted at one end of the cylinder, and the other end of the latter is connected to exhaust, the piston will move in the direction from high to low pressure and rotate shaft 14 for moving the drill-bit holder in the appropriate direction, while when these cylinder connections are reversed the said holder will be moved in the opposite direction. The cylinder is provided with appropriate supply and exhaust ports (not shown) and pneumatic valve means for this purpose.

The feed mechanism as thus far described does not form part of the invention.

For reversing the supply and exhaust connections to the cylinder a valve, of which the body is shown at 18, has its movable member 19 movable in one direction by a push button 20 and in the opposite direction by a spring 21. The end opposite the push button of the member 19 is provided with a head 22 behind which can engage a pivoted detent 23 for holding the member 19 in its inwardly pushed position against the action of the spring 21. With the detent in its operative position one end of the cylinder is connected to the air pressure supply while the other end is connected to exhaust, and when the detent is tripped as hereinafter described the spring moves the member 19 to its outer position to reverse the connections to the cylinder.

Figure 1:
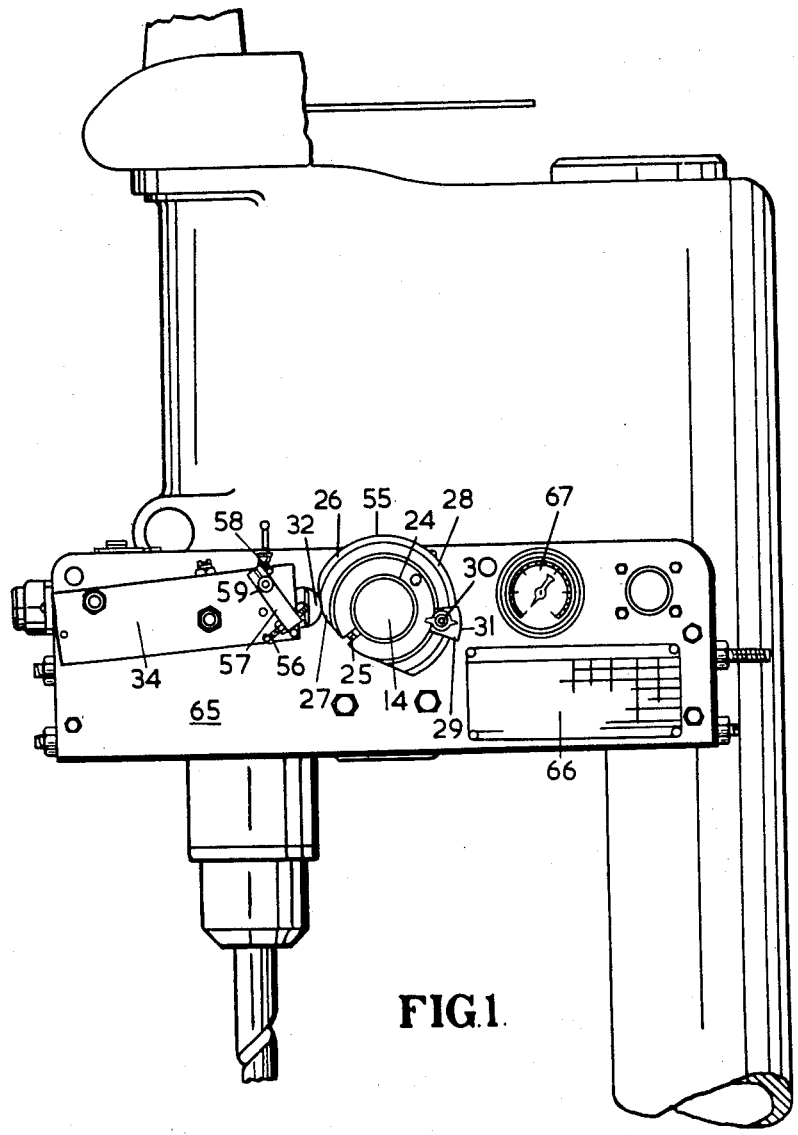
FIGURE 1 is a front elevation of a pneumatic feed mechanism for the tool holder of a drilling machine.

Also fast with shaft 14 is a cam which can best be seen in FIGURE 1. The cam has a hub 24 which has a radial split bridged by a chordwise clamping screw 25 for locking it to the shaft in a desired relative angular attitude, and the hub has a lobe 26 of which an end portion 27 is formed to provide a cam surface for reducing the rate of feed, as hereinafter described, when the drill bit engages the workpiece. The lobe is formed with an arcuate guide 28 in which is located a movable cam 29 for reducing the rate of feed, as hereinafter described, when the drill bit is about to break through the workpiece. The cam 29 is held in an adjusted position along the guide by a screw 30, which has its head engaged in an undercut of the guide, and a wing nut 31. It will be seen that this adjustment is for the purpose of setting the arcuate distance between cams 27 and 29 in sympathy with the thickness of a workpiece to be drilled.

Figure 4:
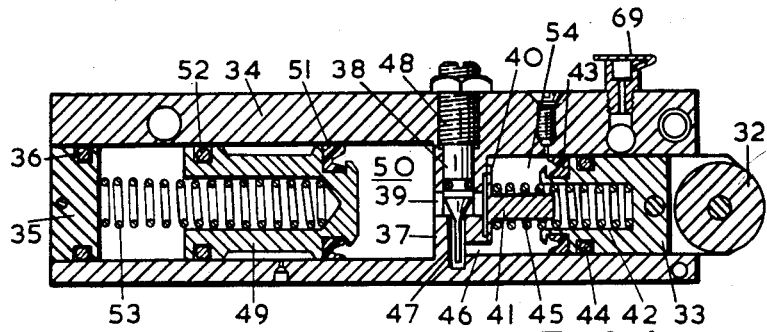
FIGURE 4 is a section, also on the line 3—3 of FIGURE 2 through the hydraulic means for controlling the rate of feed.

The cams are rotated bodily with shaft 14, and coact with a follower wheel 32 journalled in a jaw at the extending end of the plunger 33 of the hydraulic device shown in FIGURE 4 for reducing the rate of feed of the drill bit.

This hydraulic device includes a body 34 having a bore at one end in which the plunger works, and a larger diameter bore extending inwardly from its other end which latter is closed by a plug 35 having a peripheral seal 36. Between these two bores is an annular wall 37 in which is diametrically arranged an adjustable needle valve member 38. Secured to the wall 37, and closing the adjacent end of its central hole 39, is a radially flanged end 40 of a contra-piston 41 which coacts with a blind bore 42 at the inner end of plunger 33. The inner end of the plunger is formed with an annular channel for a piston ring 43, and a sealing ring 44 prevents escape of the hydraulic fluid past the plunger.

The contra-piston has radially clearance in the bore 42, and a spring 45 holds the contra-piston abutting the wall 37. The adjacent side of the wall 37 is provided with a duct 46 leading into the needle valve controlled passage 47 at one side of the hole 39 in wall 37.

It will be seen that the needle valve member 38 has a screw-threaded connection at 48 with the body 34 so that it can be adjusted axially for controlling a restriction it forms at the end of the passage 47 which breaks into the hole 39.

Between the plug 35 and wall 37 is a plunger 49 which defines between itself and the said wall a reservoir 50 for hydraulic fluid. The inner end of the plunger 49 is peripherally grooved to support a piston ring 51 and it also has a sealing ring 52. The plunger has a blind bore in its outer end in which is located one end of a compression spring 53 having its other end extending for coaction with the plug 35.

When either of the cams urges plunger 33 inwardly the hydraulic fluid in the space 54 in advance of it, and the hydraulic fluid in its blind bore 42 wil be subjected to pressure, and in being forced through the needle valve controlled restriction into reservoir 50 it will give rise to a load being applied by the follower 32 to the cam being engaged. Thus, as follower 32 encounters the rising portion of cam 37 when the drill has been fed up to the workpiece, this hydraulic load will slow down rotation of the shaft 14, and thus the rate of feed of the drill bit into the workpiece. At the end of this phase the follower will have mounted on to an arcuate portion 55 of the lobe 26 and will thus remove the restraint to rotation of shaft 14, permitting the latter to be rotated under the pneumatic pressure in cylinder 10 only. Next, when the drill bit is about to break through the workpiece cam 29 will encounter the follower and the speed of rotation of shaft 14 will again be reduced.

As each of the cams moves plunger 33 inwardly and hydraulic fluid is thus displaced into the reservoir 50, plunger 49 is forced back to compress spring 53, which latter will bias the hydraulic fluid to be returned to space 54 for moving plunger 33 outwardly when follower 32 is to ride down a cam surface.

It will be seen from FIGURE 2 that cam 29 extends forwardly so that after it has encountered follower 32 it will engage a pin 56 set in an arm 57 clamped at 58 to a shaft 59 on which the detent 23 is clamped at 60. In this way the pneumatic connections to cylinder 10 are reversed at the end of a drilling operation so as to raise the drill bit in readiness for the next drilling operation, for which latter the feed will be provided by depressing push button 20.

Figure 3:
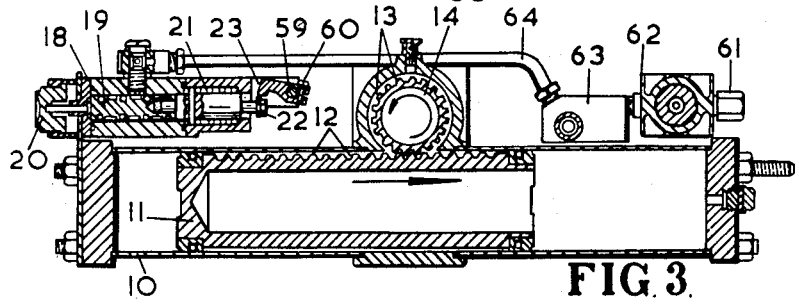
FIGURE 3 is a section of the line 3—3 of FIGURE 2 through the pneumatic motor of the feed mechanism (i)

A union for connection to a pneumatic supply main is shown in FIGURES 2 and 3 at 61, and this union conducts the pneumatic fluid to valve 18, 19 through a valve 62, a chest 63 and a pipe 64. Other parts of the pneumatic system are omitted from the drawings.

It will be seen from FIGURE 1 that the apparatus is partly masked behind a front plate 65 on which can be mounted a plate 66 showing recommended date for different types of drilling work, and a pneumatic pressure gauge 67 fed through a connection 68 from chest 63. A filler device 69 for topping up the hydraulic device, through a duct (not shown), is shown in FIGURE 4.

What I claim as my invention and desire to secure by Letters Patent of the United States is:

1. A cutting tool feed mechanism for a machine tool comprising a holder for a cutting tool, a pneumatic motor connected to move said holder for feeding a cutting tool therein relatively to a workpiece, a hydraulic cylinder having a restricted outlet for hydraulic fluid therein, a coacting hydraulic piston in said cylinder and having one end extending from an open end of said cylinder, means biasing said piston for its extending end to extend from said open end, a shaft connected to be rotatively driven from said motor, a first cam, means for making said first cam fast with said shaft in a selected position of relative orientation, said first cam to engage said extending end to urge said piston inwardly of said cylinder against said biasing means as said cutting tool engages the workpiece, said piston being thus caused to express hydraulic fluid from said cylinder through said restricted outlet to reduce the effective power of said motor applied to said tool so as to protect said tool from a sudden overload at engagement with the workpiece, said first cam provided with annular support means coaxial with said shaft, a second cam means, means for making said second cam fast with said annular support means at a selected angular spacing from said first cam, and said second cam to engage said extending end to urge said piston inwardly of said cylinder against said biasing means as said cutting tool reaches the end of its cutting operation, said piston being thus caused to express hydraulic fluid from said cylinder through said restricted outlet to reduce the effective power of said motor applied to said tool so as to prevent the workpiece from being damaged due to a sudden diminution of the resistance to the cutting operation at the end of the latter.

2. A cutting tool feed mechanism, according to claim 1, in which the restricted outlet from the cylinder is adjustable.

3. A cutting tool feed mechanism for a machine tool comprising a holder for a cutting tool, a pneumatic motor connected to move said holder for feeding a cutting tool therein relatively to a workpiece, a hydraulic cylinder having a restricted outlet for hydraulic fluid therein, a coacting hydraulic piston in said cylinder and having one end extending from an open end of said cylinder, means biasing said piston for its extending end to extend from said open end, a roller journalled from said extending end, a shaft connected to be rotatively driven from said motor, a first cam, means for making said first cam fast with said shaft in a selected position of relative orientation, said first cam to engage said roller to urge said piston inwardly of said cylinder against said biasing means as said cutting tool engages the workpiece, said piston being thus caused to express hydraulic fluid from said cylinder through said restricted outlet to reduce the effective power of said motor applied to said tool so as to protect said tool from a sudden overload at engagement with the workpiece, said first cam provided with annular support means coaxial with said shaft, a second cam means, means for making said second cam fast with said annular support means at a selected angular spacing from said first cam, and said second cam to engage said roller to urge said piston inwardly of said cylinder against said biasing means as said cutting tool reaches the end of its cutting operation, said piston being thus caused to express hydraulic fluid from said cylinder through said restricted outlet to reduce the effective power of said motor applied to said tool so as to prevent the workpiece from being damaged due to a sudden diminution of the resistance to the cutting operation at the end of the latter.

4. A cutting tool feed mechanism, according to claim 3, in which the restricted outlet from the cylinder is adjustable.

5. A cutting tool feed mechanism for a machine tool comprising a holder for a cutting tool, a pneumatic motor connected to move said holder for feeding a cutting tool therein relatively to a workpiece, a hydraulic means operable to oppose the operation of said motor, and means connected to be driven from said motor for operating said hydraulic means to reduce the effective power of said motor as said cutting tool engages the workpiece, so as to protect the cutting tool from a sudden overload at engagement with the workpiece, and to withdraw the hydraulic restraint when the cutting tool has commenced to cut the workpiece so that the remainder of the cut is made under the full power of said motor.

6. A cutting tool feed mechanism for a machine tool comprising a holder for a cutting tool, a pneumatic motor connected to move said holder for feeding a cutting tool therein relatively to a workpiece, a hydraulic means operable to oppose the operation of said motor, and means connected to be driven from said motor for operating said hydraulic means to reduce the effective power of said motor as said cutting tool engages the workpiece, so as to protect said tool from a sudden overload at engagement with the workpiece, and to withdraw the hydraulic restraint when the cutting tool has commenced to cut the workpiece so that the remainder of the cut is made under the full power of said motor, and to reduce the effective power of said motor as the cutting tool reaches the end of its cutting operation so as to prevent the workpiece from being damaged due to a sudden diminution of the resistance to the cutting operation at the end of the latter.

7. A cutting tool feed mechanism for a machine tool comprising a holder for a cutting tool, a pneumatic motor connected to move said holder for feeding a cutting tool therein relatively to a workpiece, a hydraulic means operable to oppose the operation of said motor, a first means connected to be driven from said motor for operating said hydraulic means to reduce the effective power of said motor as said cutting tool engages the workpiece, so as to protect the cutting tool from a sudden overload at engagement with the workpiece, and to withdraw the hydraulic restraint when the cutting tool has commenced to cut the workpiece so that the remainder of the cut is made under the full power of said motor, and a second means connected to be driven from said motor for operating said hydraulic means to reduce the effective power of said motor as said cutting tool reaches the end of its cutting operation so as to prevent the workpiece from being damaged due to a sudden diminution of the resistance to the cutting operation at the end of the latter.

8. A cutting tool, according to claim 7, in which the first and second means are relatively adjustable so as to adapt them for coaction with workpieces of different thicknesses.

9. A cutting tool feed mechanism for a machine tool comprising a holder for a cutting tool, a pneumatic motor connected to move said holder for feeding a cutting tool therein relatively to a workpiece, a hydraulic means operable to oppose the operation of said motor, a cam means connected to be rotatively driven from said motor, said cam means including a first cam for operating said hydraulic means to reduce the effective power of said motor as said cutting tool engages the workpiece, so as to protect the cutting tool from a sudden overload at engagement with the workpiece, and to withdraw the hydraulic restraint when the cutting tool has commenced to cut the workpiece so that the remainder of the cut is made under the full power of said motor, and said cam means including a second cam for operating said hydraulic means to reduce the effective power of said motor as said cutting tool reaches the end of its cutting operation so as to prevent the workpiece from being damaged due to a sudden diminution of the resistance to the cutting operation at the end of the latter.

10. A cutting tool feed mechanism for a machine tool comprising a holder for a cutting tool, a pneumatic motor connected to move said holder for feeding a cutting tool therein relatively to a workpiece, a hydraulic means operable to oppose the operation of said motor, a shaft connected to be rotatively driven from said motor, a first cam, means for making said first cam fast with said shaft in a selected position of relative orientation, said first cam for operating said hydraulic means to reduce the effective power of said motor as said cutting tool engages the workpiece so as to protect the cutting tool from a sudden overload at engagement with the workpiece, and to withdraw the hydraulic restraint when the cutting tool has commenced to cut the workpiece so that the remainder of the cut is made under the full power of said motor, said first cam provided with annular support means coaxial with said shaft, a second cam means, means for making said second cam fast with said annular support means at a selected angular spacing from said first cam, and said second cam for operating said hydraulic means to reduce the effective power of said motor as said cutting tool reaches the end of its cutting operation so as to prevent the workpiece from being damaged due to a sudden diminution of the resistance to the cutting operation at the end of the latter.

11. A cutting tool feed mechanism for a machine tool comprising a holder for a cutting tool, a pneumatic motor connected to move said holder for feeding a cutting tool therein relatively to a workpiece, a hydraulic means operable to oppose the operation of said motor, a cam means connected to be rotatively driven from said motor, said cam means including a first cam for operating said hydraulic means to reduce the effective power of said motor as said cutting tool engages the workpiece so as to protect said tool from a sudden overload at engagement with the workpiece, and to withdraw the hydraulic restraint when the cutting tool has commenced to cut the workpiece so that the remainder of the cut is made under the full power of said motor, said cam means including a second cam for operating said hydraulic means to reduce the effective power of said motor as said cutting tool reaches the end of its cutting operation so as to prevent the workpiece from being damaged due to a sudden diminution of the resistance to the cutting operation at the end of the latter, a valve for reversing the direction of operation of said motor, a manual control for setting said valve for said motor to feed said cutting tool for performing the cutting operation, and said second cam at the conclusion of the cutting operation actuating means for reversing the setting of said valve so as to cause said motor to retract said cutting tool in readiness for a subsequent cutting operation.

References Cited in the file of this patent

FOREIGN PATENTS 676,805     Great Britain _____ Aug. 6, 1952